United States Patent
Kolan et al.

(10) Patent No.: US 10,470,000 B2
(45) Date of Patent: Nov. 5, 2019

(54) METHODS AND APPARATUS FOR ENHANCED MBMS CONTENT PROVISIONING AND CONTENT INGESTION

(71) Applicant: Samsung Electronics Co., Ltd, Suwon-si (KR)

(72) Inventors: Prakash Kolan, Plano, TX (US); Imed Bouzizi, Frisco, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 63 days.

(21) Appl. No.: 15/424,706

(22) Filed: Feb. 3, 2017

(65) Prior Publication Data

US 2017/0238148 A1     Aug. 17, 2017

Related U.S. Application Data

(60) Provisional application No. 62/294,676, filed on Feb. 12, 2016.

(51) Int. Cl.
*H04W 4/06*     (2009.01)
*H04L 12/24*    (2006.01)
(Continued)

(52) U.S. Cl.
CPC .............. *H04W 4/06* (2013.01); *H04L 1/0009* (2013.01); *H04L 1/0011* (2013.01);
(Continued)

(58) Field of Classification Search
CPC ... H04L 41/5067; H04L 67/02; H04L 1/0023; H04L 1/0045; H04W 4/06
See application file for complete search history.

(56) References Cited

U.S. PATENT DOCUMENTS 8,064,820 B2   11/2011   Hyun et al.
9,246,842 B2    1/2016   Oyman et al.
(Continued)

FOREIGN PATENT DOCUMENTS

EP       2536093 A1     12/2012
WO    2013/182247 A1    12/2013
(Continued)

OTHER PUBLICATIONS

"3rd Generation Partnership Project; Technical Specification Group Services and System Aspects; Group Communication System Enablers for LTE (GCSE_LTE); Stage 2 (Release 13)," 3GPP TS 23.468, V13.3.0, Dec. 2015; 30 pages.
(Continued)

*Primary Examiner* — Asad M Nawaz
*Assistant Examiner* — Syed Ali

(57) ABSTRACT

A method and apparatus for enhanced multimedia broadcast/multicast service (MBMS) ingestion. A network device includes a memory configured to store a memory and one or more processors operably connected to the memory. The one or more processors configured to receive, from a content provider, signaling concerning a payload for MBMS. The one or more processors are further configured to receive, from the content provider, the payload, process the payload based on the signaling, and transmit, to an MBMS gateway, the processed payload.

20 Claims, 8 Drawing Sheets

(51) Int. Cl.
  *H04L 29/08* (2006.01)
  *H04L 1/00* (2006.01)
  *H04W 48/14* (2009.01)

(52) U.S. Cl.
  CPC .......... *H04L 1/0023* (2013.01); *H04L 1/0041* (2013.01); *H04L 1/0045* (2013.01); *H04L 41/5029* (2013.01); *H04L 41/5032* (2013.01); *H04L 41/5067* (2013.01); *H04L 67/02* (2013.01); *H04L 41/509* (2013.01); *H04W 48/14* (2013.01)

(56) References Cited

U.S. PATENT DOCUMENTS

| | | | |
|---|---|---|---|
| 9,258,736 | B2 | 2/2016 | Xiao |
| 9,516,477 | B2 | 12/2016 | Jamadagni et al. |
| 9,769,511 | B2* | 9/2017 | Bae .................. H04N 19/51 |
| 2003/0103510 | A1* | 6/2003 | Svanberg ............ H04L 12/4633 370/395.2 |
| 2009/0327842 | A1* | 12/2009 | Liu .................. H04L 1/0057 714/776 |
| 2010/0150243 | A1* | 6/2010 | Kure .................. H03M 13/353 375/240.24 |
| 2010/0220592 | A1* | 9/2010 | Pan .................. H04L 1/0009 370/232 |
| 2010/0260272 | A1* | 10/2010 | Ozawa .............. H03M 13/2909 375/240.27 |
| 2011/0019693 | A1* | 1/2011 | Fu .................. H04L 69/32 370/469 |
| 2011/0085489 | A1 | 4/2011 | Rydnell et al. |
| 2011/0252287 | A1* | 10/2011 | Kure .................. H04N 19/63 714/758 |
| 2013/0007287 | A1 | 1/2013 | Chu et al. |
| 2013/0039248 | A1 | 2/2013 | Koskinen et al. |
| 2013/0128756 | A1 | 5/2013 | Zhang et al. |
| 2013/0163455 | A1* | 6/2013 | Oguchi ................. H04W 24/02 370/252 |
| 2013/0215813 | A1 | 8/2013 | Kotecha et al. |
| 2014/0198749 | A1 | 7/2014 | Luo et al. |
| 2014/0372624 | A1* | 12/2014 | Wang ..................... H04L 65/60 709/231 |
| 2018/0041913 | A1* | 2/2018 | Zhu ........................ H04W 24/10 |
| 2018/0285054 | A1* | 10/2018 | Kim .......................... G06F 3/14 |
| 2018/0287918 | A1* | 10/2018 | Kim .................... H04L 41/5067 |

FOREIGN PATENT DOCUMENTS

| | | |
|---|---|---|
| WO | 2014011097 A1 | 1/2014 |
| WO | 2014/044329 A1 | 3/2014 |

OTHER PUBLICATIONS

Foreign Communication from Related Counterpart Application; PCT Application No. PCT/KR2017/001501; Written Opinion of the International Searching Authority dated May 15, 2017; 7 pages.

Foreign Communication from Related Counterpart Application; PCT Application No. PCT/KR2017/001501; International Search Report dated May 15, 2017; 9 pages.

Supplementary European Search Report dated Jan. 22, 2019 in connection with European Patent Application No. 17 75 0474, 9 pages.

"3rd Generation Partnership Project; Technical Specification Group Services and System Aspects; Multimedia Broadcast/Multicast Service (MBMS) improvements; MBMS operation on demand (Release 12)", 3GPP TR 26.849 v12.1.0 (Jun. 2015), 34 pages.

* cited by examiner

METHODS AND APPARATUS FOR ENHANCED MBMS CONTENT PROVISIONING AND CONTENT INGESTION

CROSS-REFERENCE TO RELATED APPLICATION(S) AND CLAIM OF PRIORITY

This application claims priority under 35 U.S.C. § 119(e) to U.S. Provisional Patent Application No. 62/294,676 filed on Feb. 12, 2016, entitled "METHODS AND APPARATUS FOR ENHANCED MBMS CONTENT INGESTION." The above-identified provisional patent application is hereby incorporated by reference in its entirety.

TECHNICAL FIELD

This disclosure relates generally to media data conversion. More specifically, this disclosure relates to methods and apparatus for enhanced multi-media broadcast/multicast service (MBMS) provisioning and content ingestion.

BACKGROUND

The MBMS specification is built around two delivery methods, download and streaming, which are used to build user services. A user service consists of one or more delivery methods, auxiliary delivery procedures, such as file repair and reception reporting, and a user service description to enable selection and access to the service. Over the past years, MBMS has proven to be most relevant for streaming of live events over a limited MBMS broadcast area and distribution of high popularity files such as firmware updates.

SUMMARY

This disclosure provides methods and apparatus for enhanced multi-media broadcast/multicast services (MBMS) provisioning and content ingestion.

In one embodiment, a network device for enhanced multimedia broadcast/multicast service (MBMS) includes a memory and one or more processors operably connected to the memory. The one or more processors configured to receive, from a content provider, signaling concerning a payload for MBMS. The one or more processors are further configured to receive, from the content provider, the payload, process the payload based on the signaling, and transmit, to an MBMS gateway, the processed payload.

In another embodiment, a content provider for enhanced multimedia broadcast/multicast service (MBMS) is provided. The content provider includes a memory and one or more processors operably connected to the memory. The one or more processors are configured to generate a signaling based on a payload. The one or more sources are further configured to transmit, to a network device, signaling concerning a payload for MBMS; and transmit, to the network device, the payload to be processed based on the signaling In a third embodiment, a method for enhanced multimedia broadcast/multicast service (MBMS) ingestion by a network device is provided. The method includes receiving, from a content provider, signaling concerning a payload for MBMS. The method also includes receiving, from the content provider, the payload, processing the payload based on the signaling, and transmitting, to an MBMS gateway, the processed payload. The method also includes transmitting, to the content provider, the result of the processing.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
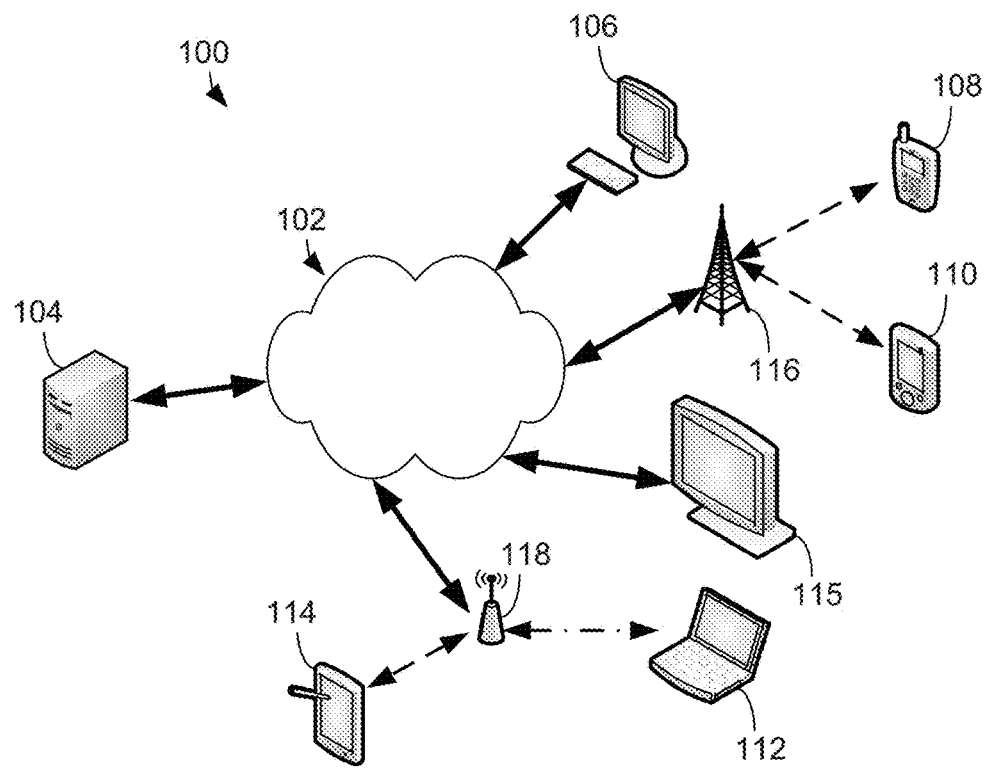
FIG. 1 illustrates an example computing system according to various embodiments of the present disclosure.

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

An intuitive method of delivering the same content to a large group of users is to utilize a broadcasting mechanism instead of allocating dedicated network resources for every single user. Delivery of TV channels and push of large software updates over the air are examples of such services that benefit greatly from broadcast.

Long-term evolution (LTE) defined the multimedia broadcast multicast service (MBMS) to address the needs of these services in the most cost-efficient way. It initially defined two different modes: broadcast and multicast. The multicast mode was however dropped as the savings were eliminated by the usage of tunneling of the user space multicast traffic.

$3^{rd}$ generation partnership project (3GPP) TS 23.468 (GCSE) and TS 29.116 specifications define interface specifications for MBMS content ingestion. The interfaces provide the ability for a third party application/server to send unicast or broadcast packets using MBMS transport to set of user equipments (UEs) that are subscribed to the service provided by the content provider. These unicast/broadcast packets are sent to the UE through broadcast multicast service center (BM-SC), which is referred to as a network device, and the MBMS gateway. Existing solutions specify redundant mechanisms for both content provider and network device to implement, especially on the content ingestion interface between the content provider and network device. The mechanisms are optimized for unicast delivery and are either insufficient or too complex to be implemented in a broadcast environment. In addition, the current solutions do not provide several essential features for content provider during broadcast transmission. Features such as error resilience, reporting, service announcement, and security have different requirements when being used in a unicast environment compared to a broadcast environment. Furthermore, based on the existing specification, the content provider cannot benefit from some of the features that have been standardized or implemented already in network device. The current specification discloses the following:

The content provider, instead of acting as a multicast/broadcast source during broadcast transmissions, sends the user datagram protocol (UDP) data packets to the network device, and the network device creates a broadcast session, thus acting as a multicast/broadcast source. To achieve this, the content ingestion interface is enhanced to enable transmission of user plane data to the network device at the UDP layer, thus delegating the responsibility to source the multicast data to the network device.

When content provider needs to create a broadcast session with a set of UEs, it requests the network device for creation of a broadcast session and provides forward error coding (FEC), quality of service (QoS) (quality of environment (QoE) reporting, consumption reporting etc.), and MBMS operation on demand (MOOD) features. To support this, the existing content ingestion interface is enhanced between the content provider and network device.

To use the new service announcement features provided by the network device (e.g., using open mobile alliance (OMA) PUSH and Service Announcement Channel), the content ingestion interface is enhanced so these features could be requested or used by content provider during session setup. A network device can include, for example, a gateway, a router, an access point, a server farm, or any other device in a mobile network. A content provider device can be a third party server or any other network device that provides content to a user.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANS), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides for enhanced MBMS ingestion. For example, server 104 may provide for signaling of FEC for error recovery and resilience, QoE reporting based on statistic computation at the network device, service announcement using the network device supported mechanisms, consumption reporting based on statistic computation at the network device, MBMS operation on demand functionality, and multicasting sourcing.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
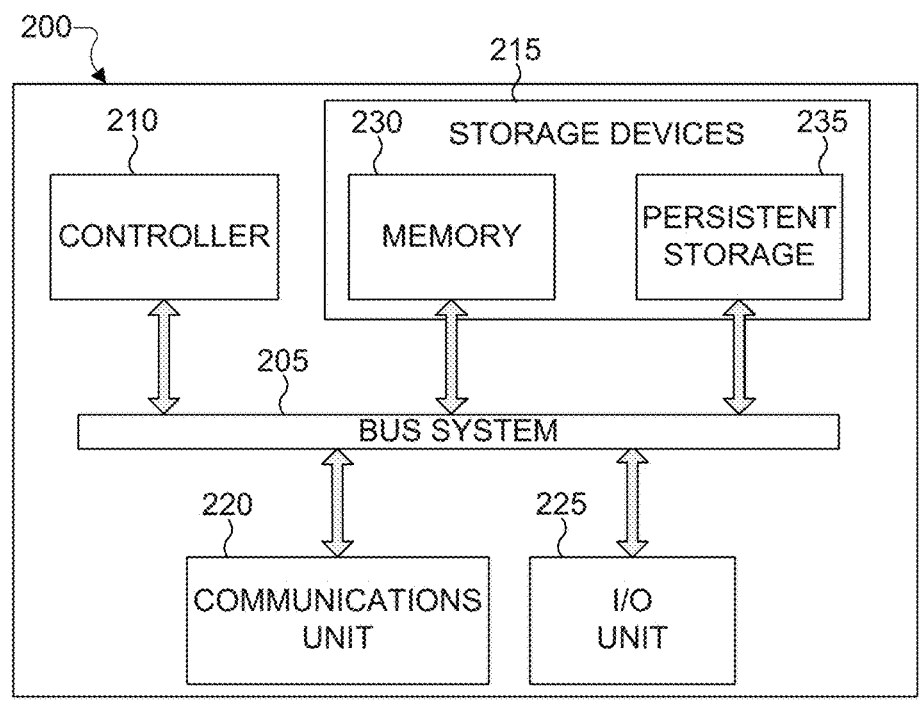
FIGS. 2 and 3 illustrate example devices in a computing system according to various embodiments of the present disclosure.
Figure 3:
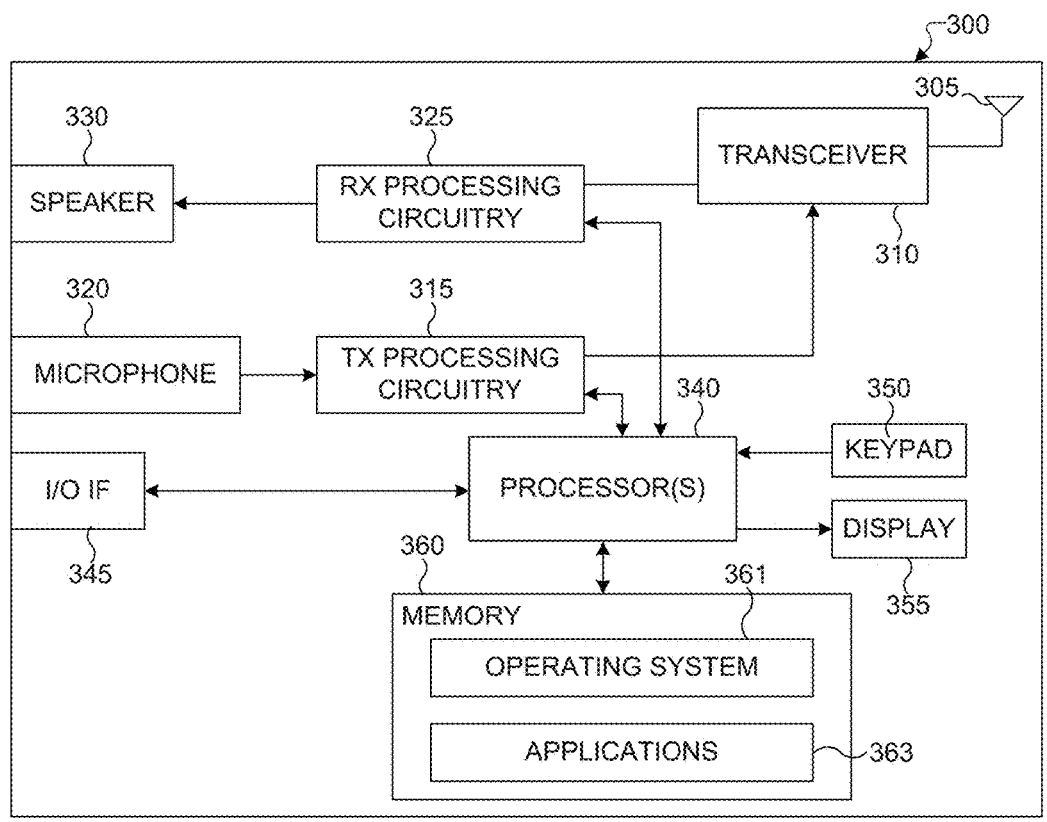

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between one or more processors 210, at least one storage device 215, at least one communications unit 220, and at least one input/output (I/O) unit 225.

The processor(s) 210 execute instructions that may be loaded into a memory 230, such as instructions for enhanced MBMS ingestion. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for enhanced MBMS ingestion, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display unit 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 receives encoded videos from server 104 over network 102 using MBMS techniques. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
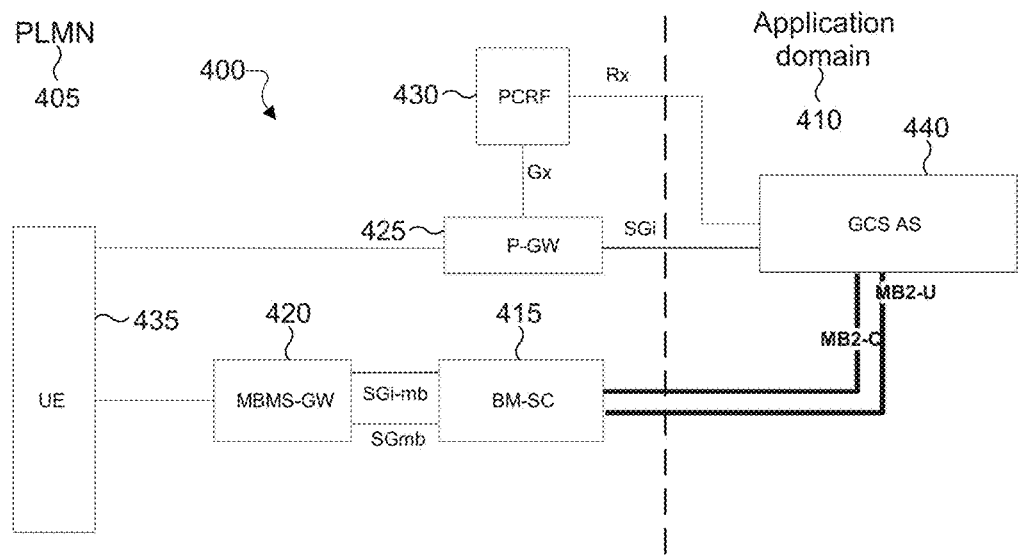
FIG. 4 illustrates an example reference model for a group communication system enabler according to various embodiments of the present disclosure.

FIG. 4 illustrates an example reference model 400 for a group communication system enabler according to an embodiment of this disclosure. The embodiment of the reference model 400 for a group communication system enabler shown in FIG. 4 is for illustration only. Other embodiments of the reference model 400 for a group communication system enabler may be used without departing from the scope of this disclosure.

The reference model 400 includes a public land mobile network 405 and an application domain 410. The public land mobile network 405 includes a network device 415, a MBMS gateway 420, a packet data network gateway (P-GW) 425, a policy and charging rules function (PCRF) 430, user equipment 435. The application domain 410 includes a group communication system (GCS) application server (AS) 440.

The network device 415 in reference model 400 only works for group communications and limited to public safety applications. The content ingestion interface between the content provider 440 and the network device 415 does not allow for service-session request setup with FEC activation, multicast sourcing, QoE and consumption reporting, service announcement, and MOOD.

Although FIG. 4 illustrates one example of reference model 400 for a group communication system enabler, various changes may be made to FIG. 4. For example, various components in FIG. 4 may be combined, further subdivided, or omitted and additional components may be added according to particular needs.

Figure 5:
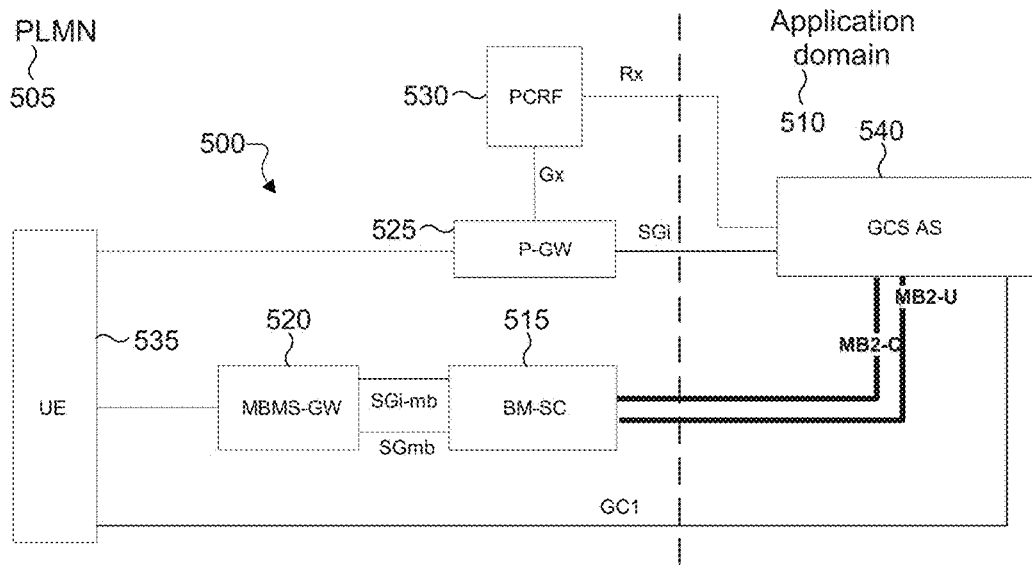
FIG. 5 illustrates an example reference model for a group communication system enabler according to various embodiments of the present disclosure.

FIG. 5 illustrates an example reference model 500 for a group communication system enabler according to an embodiment of this disclosure. The embodiment of the reference model 500 for a group communication system enabler in FIG. 5 is for illustration only. Other embodiments of the reference model 500 for a group communication system enabler may be used without departing from the scope of this disclosure.

The reference model 500 includes a public land mobile network 505 and an application domain 510. The public land mobile network 505 includes a network device 515, a MBMS gateway 520, a packet data network gateway (P-GW) 525, a policy and charging rules function (PCRF) 530, user equipment (UE) 535. The application domain 510 includes a group communication system (GCS) application server (AS) 540.

The content provider 540 in reference model 500 allows for group communication directly to the UEs 535. content provider 540 creates or sources and encapsulates the user plane IP multicast packets when it sends them to the network device 515. This increases the burden on the content provider 540 and limits the flexibility available to the network device 515. The content provider 540 performs double the effort in first creating the IP multicast packets and then the unicast packets destined towards the network device 515. The network device 515 is also limited in selecting the mode of communication with the MBMS gateways 520, since it uses encapsulation of the MBMS user plane data in another multicast session.

The content provider 540 may not benefit from some of the functionality that is offered by the network device 515 to monitor and improve the QoS over the broadcast channel, such as QoE and consumption reporting, service announcement, and MBMS on demand delivery. The GC1 interface, which is not defined in this specification, may have to be overloaded with similar functionality, leading to redundancy and inefficiency.

The content provider 540 may not benefit from the security procedures that are devised for protection of data delivered over broadcast and has to replicate that functionality at the content provider 540.

Although FIG. 5 illustrates one example of reference model 500 for a group communication system enabler, various changes may be made to FIG. 5. For example, various components in FIG. 5 may be combined, further subdivided, or omitted and additional components may be added according to particular needs.

Figure 6:
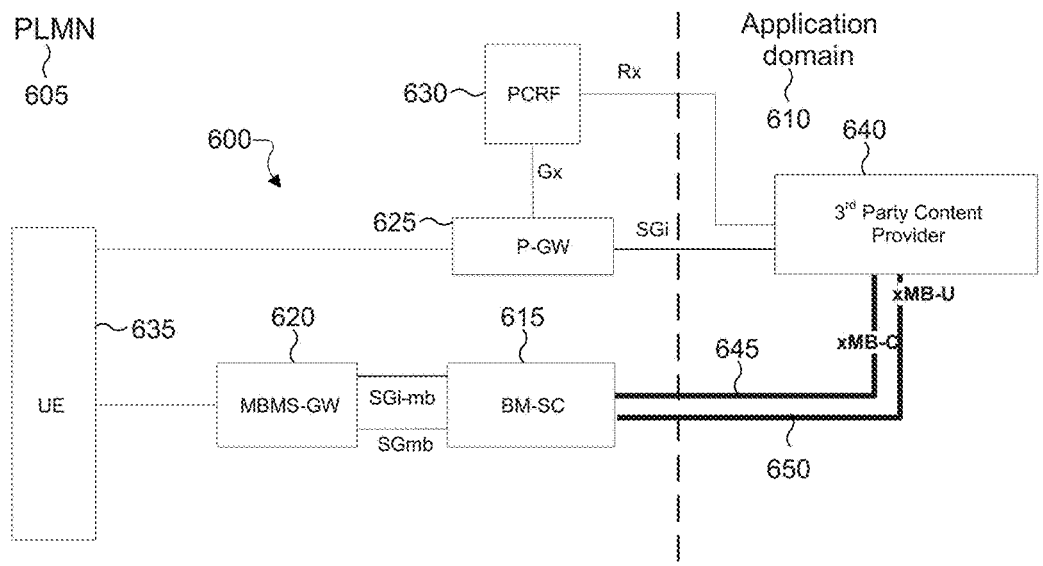
FIG. 6 illustrates an example reference model for enhanced service provisioning and content ingestion according to various embodiments of the present disclosure.

FIG. 6 illustrates an example reference model 600 for MBMS service provisioning and content ingestion according to an embodiment of this disclosure. The embodiment of the reference model 600 for a group communication system enabler shown in FIG. 6 is for illustration only. Other embodiments of the reference model 600 for a group communication system enabler may be used without departing from the scope of this disclosure.

In FIG. 6, the xMB interfaces 645 and 650 are used to communicate between the network device 615 and the content provider 640. The xMB interfaces 645 and 650 allow communication using various methods including, for example, download, streaming, group communication, transport method, etc, which is different from general MB2 interfaces that only support group communication.

The reference model includes a public land mobile network 605 and an application domain 610. The public land mobile network 605 includes a network device 615, a MBMS gateway 620, a packet data network gateway (P-GW) 625, a policy and charging rules function (PCRF) 630, user equipment 635. The application domain 610 includes a group communication system (GCS) application server (AS) 640.

Given that broadcast delivery has significantly different requirements than unicast, GCS applications are then required to treat traffic that is sent over broadcast differently. This is not limited to the tunneling of the multicast packets over unicast over the content ingestion interface. Other aspects such as error resilience, security, service announcement/discovery, and reporting must be considered when delivery data over broadcast. In particular, the following functions need to be provided:

Error Resilience and Recovery: the broadcast delivery is prone to packet losses due to the use of the unacknowledged mode and the lack of procedures such as hybrid automatic repeat request (ARQ) and adaptation based on the channel quality indication (CQI). FEC is a core part of the network device transmission function to address this shortcoming. In addition, other procedures that are traffic specific, such as real-time transport protocol (RTP) retransmission and file repair are also defined. A mechanism for establishing broadcast sessions with error recovery capabilities is provided.

Reporting: network device 615 continuously collects information from the UEs about their consumption of the user service and the quality of the reception. This information helps the network device 615 to optimize the service offering and even to decide about the current coverage of the service. This information can also be used to trigger MOOD based on the uptake of the user service. All these procedures are specific to the broadcast distribution and are not relevant for the unicast delivery of the service. The content provider 640 can benefit from getting this information from network device 615. A mechanism for exchange of such information between the network device 615 and content provider 640 is provided.

Service Announcement: the network device 615 provides tools for service announcement over unicast and broadcast using OMA PUSH and a service announcement channel (SACH). These tools are dedicated to the announcement of data availability over MBMS. The content provider 640 has limited access to replicate this functionality and relies on the under-specified GC1 interface to distribute the service announcement. A mechanism for the content provider 640 to reuse the network device tools for service announcement instead of enhancing GC1 interface for such announcements is provided.

Multicast Sourcing: network device 615 includes capabilities for broadcast and multicast session creation. Instead of content provider encapsulating user plane multicast packets into unicast for sending them to network device 615, the content provider 640 can directly send the UDP data packets to network device 615 and have the network device 615 source the multicast or broadcast packets. This way, lot of the burden on content provider 640 and network device 615 is reduced. A mechanism for content provider 640 to request network device 615 to perform multicast sourcing is provided.

Although FIG. 6 illustrates one example of reference model 600 for a group communication system enabler, various changes may be made to FIG. 6. For example, various components in FIG. 6 may be combined, further subdivided, or omitted and additional components may be added according to particular needs.

Figure 7:
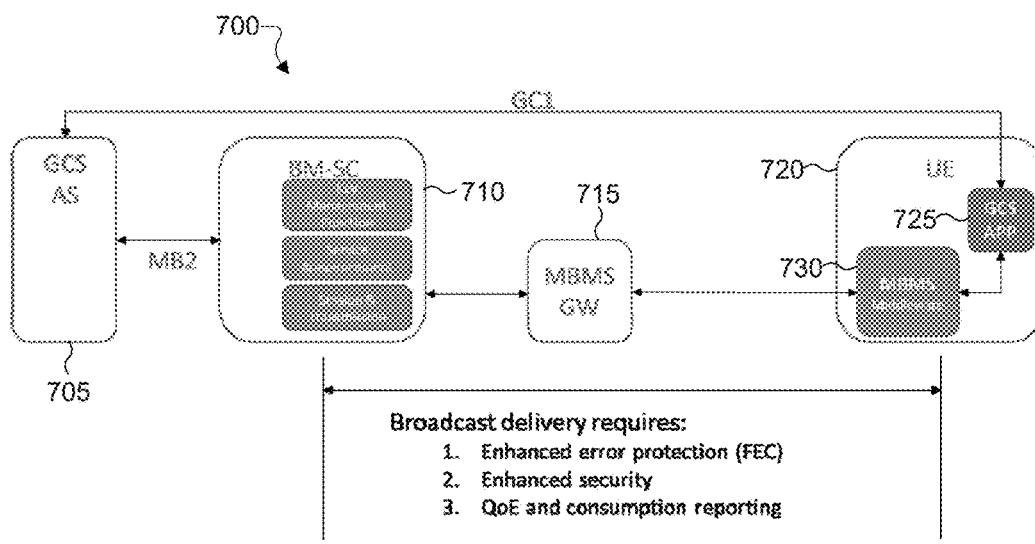
FIG. 7 illustrates an example reference model for a network device for the broadcast link that can be offered to the content provider for reuse according to various embodiments of the present disclosure.

FIG. 7 illustrates an example reference model 700 for a network device for the broadcast link that can be offered to the content provider for reuse according to an embodiment of this disclosure. The embodiment of the reference model for a network device for the broadcast link that can be offered to the content provider for reuse shown in FIG. 7 is for illustration only. Other embodiments of the reference model for a network device for the broadcast link that can be offered to the content provider for reuse may be used without departing from the scope of this disclosure.

The reference model 700 includes a content provider 705, a network device 710, an MBMS GW 715, and a UE 720. The reference model 700 shows the functionality that is provided by the network device 710 for the broadcast link that can be offered to the content provider 705 for reuse. Note that the GCS application 725 is a separate entity from the MBMS middleware 730 and as such might not have sufficient access to the MBMS delivery information to feed back to the content provider 705 over the GC1.

To eliminate redundancy at the content provider 705 for simplicity, the content ingestion interfaces need to be enhanced to make use as much as possible of network device procedures without the need to replicate them at the content provider 705. These enhancements provide the content provider 705 with additional options to facilitate the development and deployment of new group communication services based on the GCS enabler.

Although FIG. 7 illustrates one example of reference model 700 for a network device for the broadcast link that can be offered to the content provider for reuse, various changes may be made to FIG. 7. For example, various components in FIG. 7 may be combined, further subdivided, or omitted and additional components may be added according to particular needs.

The following descriptions of FIGS. 8-13_refer to attribute-value pairs ("AVPs"), GCS-Action-Requests ("GAR requests"), generic authentication architecture ("GAA commands"), "AVP codes," and augmented Backus-Naur from ("ABNF grammar"), which are all syntax of Diameter protocol for illustration. Any protocol could be used in place of Diameter protocol, including, for example, HTTP, REST API, TACACS, Radius, etc.

Figure 8:
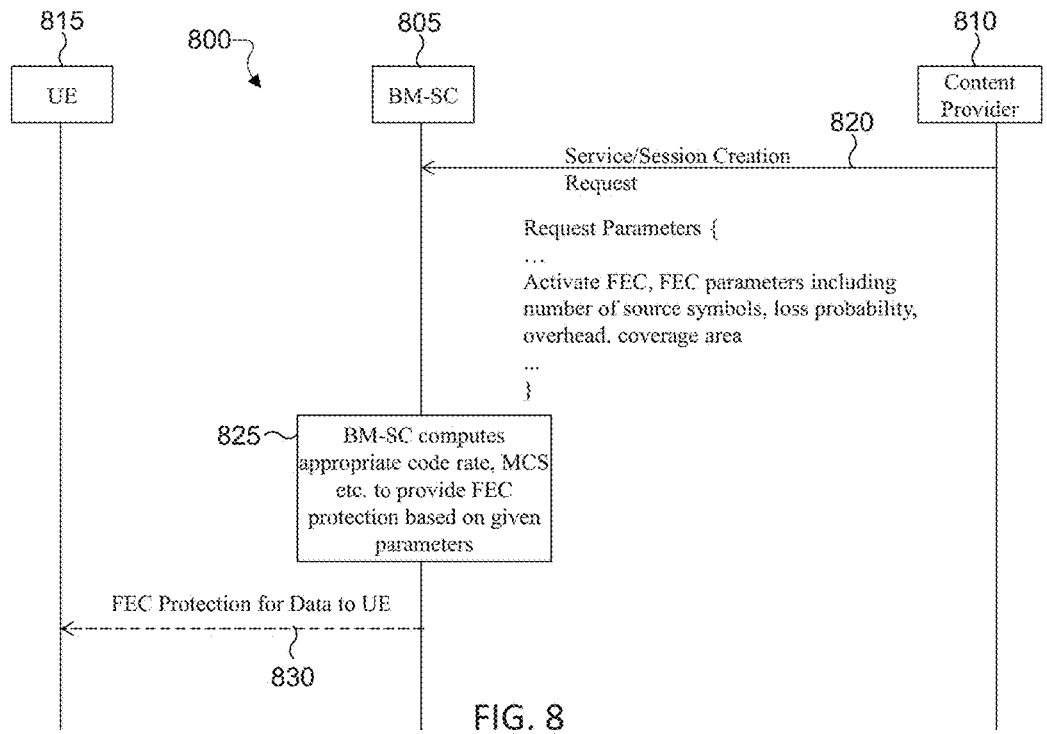
FIG. 8 illustrates an example signal diagram for signaling FEC for error recovery of an MBMS stream according to various embodiments of the present disclosure.

FIG. 8 illustrates an example signal diagram 800 for signaling FEC for error recovery of an MBMS stream according to an embodiment of this disclosure. The embodiment of the signal diagram 800 for signaling FEC for error recovery of an MBMS stream shown in FIG. 8 is for illustration only. Other embodiments of the signal diagram 800 for signaling FEC for error recovery of an MBMS stream may be used without departing from the scope of this disclosure.

In operation 820, the network device 805 receives an FEC service request message from a content provider, content provider 810. The network device 805 provides error recovery during MBMS transmission, which can be used by content provider 810 while requesting creation of broadcast session. To enable this, the request during MBMS bearer activation (GAR) can be enhanced. When the content provider 810 sends the GAR request to network device 805 during bearer activation, it also requests activation of FEC on the broadcast link. For FEC activation, it supplies various parameters such as bundling FEC on multiple UDP ports (e.g., if different multimedia streams are transported using different UDP ports) and constraints such as max-delay etc.

For requesting activation of FEC on the broadcast link, for content ingestion interface using Diameter, the content provider 810 sends a GAR request by including a new AVP called "MBMS-Bearer-FEC-Request." This AVP includes an AVP code of 3518 with a value type of "Grouped." The AVP has the following ABNF grammar:

MBMS-Bearer-FEC-Request::=<AVP Header: 3518>
{Enable-FEC}
[Bundle-FEC]
[Max-Delay]
[Max-PLR]
[Coverage-Area]
*[AVP]

Below is a brief explanation of AVPs included inside the MBMS-Bearer-FEC-Request:

Enable-FEC: The FEC request includes an indication of FEC activation is required for the payload. The AVP specifying the FEC activation request. The value for this AVP is "1" (enable FEC) or 0 (Disable FEC). This AVP is mandatory and has to be included. The AVP Code of this AVP is 3519.

Bundle-FEC: The FEC request includes an indication whether to bundle two or more ports. The AVP specifying if two or more UDP ports (e.g., audio and video streams) need to be bundled for FEC. The value of this AVP is a comma separated list of UDP port numbers. The AVP Code of this AVP is 3520.

Max-delay: The FEC request includes an indication of a maximum delay for computing the minimum buffer time for FEC operations. The network device 805 uses max-delay to compute the min-buffer-time for FEC operations. If BundleFEC has multiple port numbers, this Max-Delay applies to all port numbers in the Bundle-FEC list. The AVP Code of this AVP is 3521.

Max-PLR (Max Packet Loss Rate): The FEC request includes an indication of an amount of a packet loss rate. For the network device 805 to pick appropriate FEC to provide this amount of packet loss rate. The value ranges from 0-100. The AVP Code of this AVP is 3522.

Coverage-Area: The FEC request includes an indication for a percentage of coverage area to provide 100% recovery. The network device 805 to pick appropriate FEC to provide 100% recovery for this percentage of coverage area. The value ranges from 0-100. The AVP code of this AVP is 3523.

Based on a GAR command with MBMS-Bearer-FEC-Request AVP i.e. request for enabling FEC, the network device 805 can choose to enable FEC or ignore it. The response for such a request is made using the GAA command with a new AVP called "MBMS-Bearer-FEC-Response." This AVP includes an AVP code of 3524 with a value type of "Grouped."

In operation 825, the network device 805 computes appropriate code rates, MCS, etc. to provide FEC protection based on the given parameters. Based on the FEC activation request and the supplied parameters, the network device 805 chooses an appropriate FEC and applies FEC on the MBMS bearers corresponding to that bearer activation request. Based on the applied FEC, the UEs 815 in the group can perform error recovery using the FEC packets. Alternatively, the network device 805 can choose to ignore FEC activation and proceed in default operation (no FEC). The response for FEC activation is sent by the network device 805 to content provider 810 using a GAA command.

The FEC protection is provided for partial coverage areas. The FEC protection is requested as a percentage of coverage area (p %). In certain embodiment, 100% protection (0% error rate) is request for a percentage of users in the coverage area. The network device computes a code rate based on loss probability (l), additional overhead ($\in$), number of source symbols (k), and requested coverage area (p %) using, for example, the following equations:

Number of source symbols=$k$

Loss probability $l=f(p)$ i.e. the loss probability is modeled as a function of coverage area Additional overhead=$\in$(as percentage of number of source symbols)

Total output symbols=$k+l+\in/k=k2+(l\in)/k$ $$\text{Code rate} = \frac{k}{\frac{k^2+(l+\in)}{k}} = \frac{k^2}{k^2+l+\in}$$

The previous equations are for exemplary purposes only, other computed code rates fall within this disclosure. A network device map table can be used for a given k,l, $\in$, and p, to determine a code rate=f(k,l,p,$\in$). MBMS loss distribution can be modeled instead of uniform distribution to get optimized code rate. Content provider can provide l, p, $\in$0 and the network device 805 can choose an appropriate k to get an optimized code rate by looking up into the above lookup table. In other embodiments, the content provider 810 provides p, and the network device 805 chooses the rest of the parameters for an operator controlled transmission.

In operation 830, the network device 805 transmits the payload with FEC protection to the UE 815. For a successful FEC response (i.e. when the network device agrees to apply FEC on the broadcast link), the response to content provider 810 includes the Max-Delay AVP, Max-PLR AVP, Coverage-Area AVP, and a new AVP called the "MBMS-Bearer-FEC-Result." The values of the three AVPs (Max-Delay AVP, Max-PLR AVP, and Coverage-Area AVP) in the response are the values that the network device 805 actually applies for FEC and could be different than the values requested. The "MBMS-Bearer-FEC-Result" AVP includes an AVP code of 3525 and is of type Unsigned32 and contains a bit mask as defined in the following table:

| Bit | Name | Description |
| --- | --- | --- |
| 0 | Success | The requested FEC activation was successful |
| 1 | Bundling rejected | The request for bundling (applying FEC on multiple ports) cannot be accommodated |
| 2 | Coverage area not allowed | The requested coverage area cannot be accommodated |
| 3 | Request ignored | The request for FEC activation is ignored |

With the "MBMS-Bearer-FEC-Result" AVP, the "MBMS-Bearer-FEC-Response" AVP has the following ABNF grammar:

MBMS-Bearer-FEC-Response::=<AVP Header: 3524>
[MBMS-Bearer-FEC-Result]
[Max-Delay]
[Max-PLR]
[Coverage-Area]
*[AVP]

Although FIG. 8 illustrates one example of signal diagram 800 for signaling FEC for error recovery of an MBMS stream, various changes may be made to FIG. 8. For example, various components in FIG. 8 may be combined, further subdivided, or omitted and additional components may be added according to particular needs.

Figure 9:
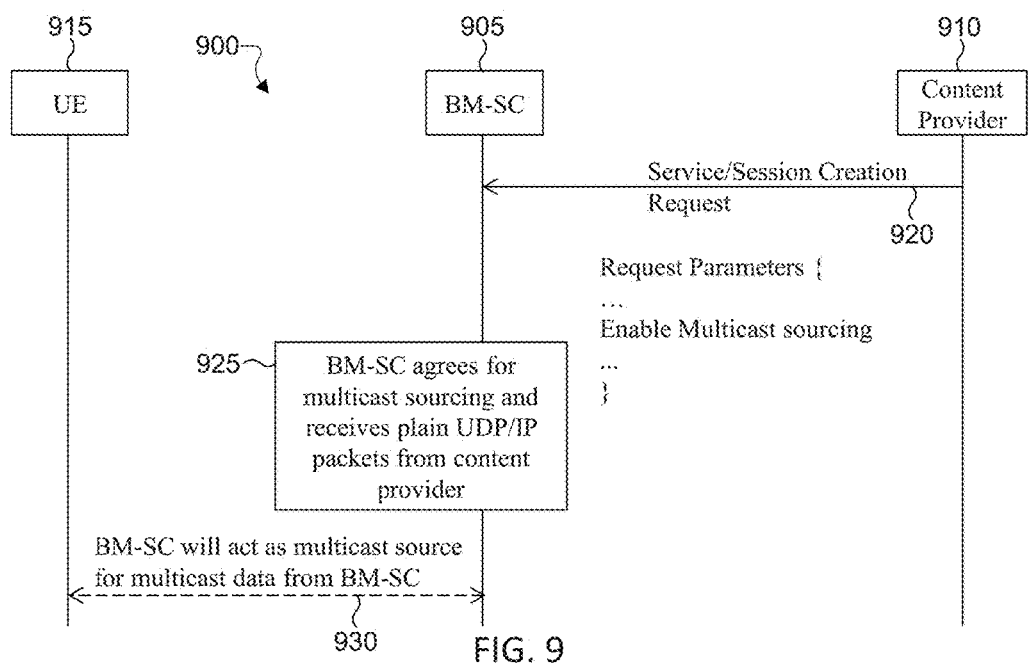
FIG. 9 illustrates an example signal diagram for signaling multicast sourcing of an MBMS stream according to various embodiments of the present disclosure.

FIG. 9 illustrates an example signal diagram 900 for signaling multicast sourcing of an MBMS stream according to an embodiment of this disclosure. The embodiment of the signal diagram 900 for signaling multicast sourcing of an MBMS stream shown in FIG. 9 is for illustration only. Other embodiments of the signal diagram 900 for signaling multicast sourcing of an MBMS stream may be used without departing from the scope of this disclosure.

In operation 920, the network device 905 receives a multicast sourcing request from a content provider, content provider 910. Network device 905 possesses capabilities for creating a multicast/broadcast session. On request of content provider 910, the network device 905 creates a multicast/broadcast session and acts as a source for data transmission instead of delegating the responsibility of sourcing to content provider 910. To activate this feature, the content provider 910 requests activation of multicast sourcing by sending a GAR command with necessary details to network device 905.

For requesting activation of multicast sourcing, for content ingestion interface using Diameter, the content provider 910 sends a GAR request by including a new AVP called "MBMS-Multicast-Sourcing-Request". This AVP includes an AVP code of 3555 with a value type of "Grouped." The AVP has the following ABNF grammar:

MBMS-Multicast-Sourcing-Request::=<AVP Header: 3555>
{Enable-Multicast-Sourcing}
*[AVP]

Below is a brief explanation of AVPs included inside the MBMS-Activate-Multicast-Sourcing AVP:

Enable-Multicast-Sourcing: The multicast sourcing request includes an indication of multicast sourcing activation is required for the payload. The AVP specifies the activation of multicast sourcing. The value for this AVP is "1" (enable multicast sourcing) or 0 (disable multicast sourcing). This AVP is mandatory and has to be included. The AVP Code of this AVP is 3556.

In operation 925, the network device 905 agrees to multicast sourcing and receives plan UDP/IP packets from the content provider 910. Based on the GAR command with multicast sourcing request, the network device can act as a source of multicast/broadcast. To operate in this mode, the content provider and network device exchange UDP data packets over unicast, and the network device uses those UDP packets and sources the multicast/broadcast packets to the users. It is not mandatory that network device 905 approves such a request from content provider 910. However, the network device 905 acknowledges this request from content provider 910, so content provider 910 can source the packets if the network device 905 denies the request. The acknowledgement is performed by the network device 905 using a GAA command.

In operation 930, the network device 905 transmits a message to the UE 915 indicating that the network device will act as the multicast source for multicast data from the network device 905. Based on a GAR command with MBMS-Multicast-Sourcing-Request AVP i.e. request for activation of multicast sourcing, the network device 905 can choose to agree for multicast sourcing or ignore it. The response for such a request is made using the GAA command with a new AVP called "MBMS-Multicast-Sourcing-Response". This AVP will have an AVP code of 3557 with a value type of Unsigned32 and it shall contain a bit mask as defined in the following table:

| Bit | Name | Description |
| --- | --- | --- |
| 0 | Success | The request for multicast sourcing is accepted |
| 1 | Request denied | The request for multicast sourcing is denied |

Although FIG. 9 illustrates one example of signal diagram 900 for signaling multicast sourcing of an MBMS stream, various changes may be made to FIG. 9. For example, various components in FIG. 9 may be combined, further subdivided, or omitted and additional components may be added according to particular needs.

Figure 10:
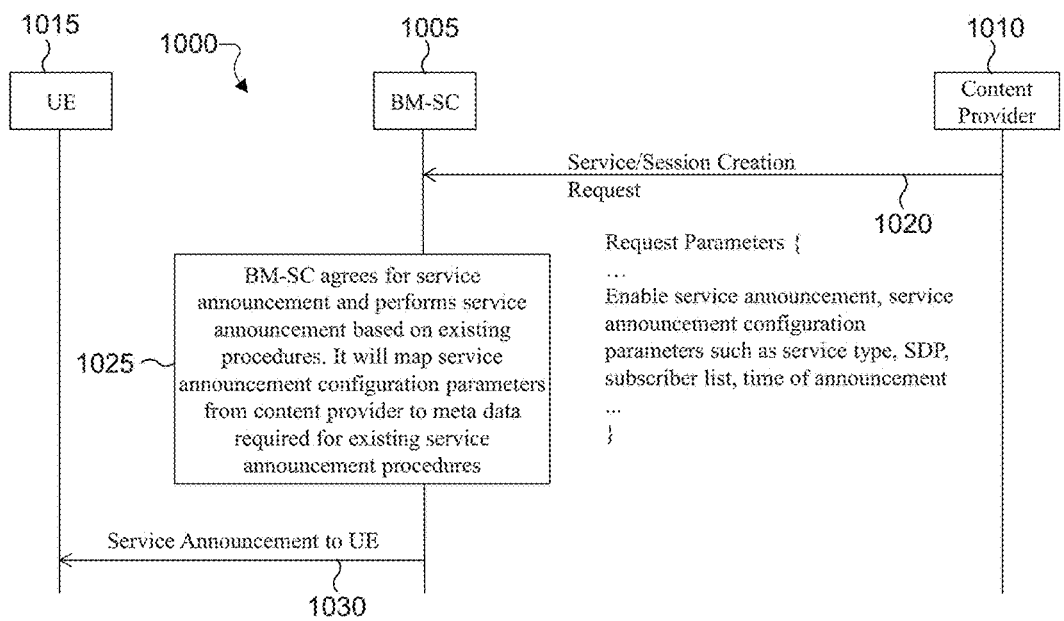
FIG. 10 illustrates an example signal diagram for signaling service announcement of an MBMS stream according to various embodiments of the present disclosure.

FIG. 10 illustrates an example signal diagram 1000 for signaling service announcement of an MBMS stream according to an embodiment of this disclosure. The embodiment of the signal diagram 1000 for signaling service announcement of an MBMS stream shown in FIG. 10 is for illustration only. Other embodiments of the signal diagram 1000 for signaling service announcement of an MBMS stream may be used without departing from the scope of this disclosure.

In operation 1020, the network device 1005 receives a service announcement request message from a content provider, content provider 1010. The network device 1005 possesses capabilities for service announcement over unicast and broadcast using OMA PUSH and a service announcement channel (SACH). This feature can be used by the content provider 1010 to request service announcement to a list of users. The content provider 1010, before sending the GAR request to network device 1005 for TMGI allocation, requests activation of service announcement. As part of this activation request, content provider 1010 provides additional details such as service type (if unicast of broadcast), the announcement SDP, list of users, the announcement time, and the service time. If the announcement is intended for a unicast service, only the list of users (e.g., mobile subscriber integrated service digital network (ISDN) number (MSISDN) numbers) authorized to receive the data is included in the list of users provided to network device 1005. Otherwise, if the announcement is intended for a broadcast service, the list of users is not provided to the network device 1005.

The GAR request can be used for activation of service announcement by including a new AVP called "MBMS-Service-Announcement-Request". This AVP includes an AVP code of 3536 with a value type of "Grouped." The AVP has the following ABNF grammar: MBMS-Service-Announcement-Request::=<AVP Header: 3536>
{Enable-Service-Announcement}
[Service-Type]
[Announcement-SDP]
[Subscriber-List]
[Announcement-Start-Time]
[MBMS-Start-Time]
[AVP]

Below is a brief explanation of AVPs included inside the MBMS-Service-Announcement-Request:

Enable-Service-Announcement: The service announcement request includes an indication of a service announcement activation is required for the payload. The AVP specifies the activation request of service announcement. The value for this AVP is "1" (enable Service Announcement) or 0 (Disable Service Announcement). This AVP is mandatory and has to be included. The AVP Code of this AVP is 3537.

Service-Type: The service announcement request includes an indication of a service type announcement. The AVP specifies the service type. The possible values of this AVP are "Unicast" or "Broadcast". The AVP Code of this AVP is 3538.

Subscriber-List: The service announcement request includes an indication of a subscriber list. For unicast service type, this AVP specifies the list of MSISDNs. For multicast, this AVP is not included. The AVP Code of this AVP is 3539.

Announcement-SDP: The service announcement request includes an indication of a URL of an SDP file for a service announcement. The AVP specifies the URL of the SDP file for service announcement. The AVP Code of this AVP is 3540.

Announcement-Start-Time: The service announcement request includes an indication of a start time for a service announcement. This AVP specifies the start time of service announcement. The AVP Code of this AVP is 3541.

MBMS-Start-Time: The service announcement request includes an indication for a start time for MBMS service. This AVP specifies the start time of service. The AVP Code of this AVP is 3507.

If the content provider 1010 wishes to perform a service announcement, it must first do so before requesting for temporary mobile group identity (TMGI) allocation using the TMGI allocation procedure.

In operation 1025, the network device 1005 agrees for a service announcement and performs the service announcement. The network device 1005 maps the service announcement configuration parameter from the content provider to metadata required for existing service announcement procedures. Based on the GAR command with service announcement activation request, the network device 1005 performs service announcement either using OMA PUSH or a service announcement channel (SACH) depending upon the service type in the activation request. Alternatively, the network device 1005 can choose to ignore service announcement activation request if it does not support service announcement or if the network device's policy does not allow such kind of announcements. The response for service announcement request is sent by the network device 1005 to content provider 1010 using a GAA command.

Based on a GAR command with MBMS-Service-Announcement-Request AVP i.e. request for enabling service announcement, the network device 1005 can choose to perform the announcement or ignore it. The response for such a request is made using the GAA command with a new AVP called "MBMS-Service-Announcement-Response." This AVP will have an AVP code of 3542 with a value type of "Grouped."

In operation 1030, the network device 1005 transmits a service announcement message to the UE 1015 based on the parameters provided in the service announcement request. For a successful service announcement response (i.e. when the network device 1005 agrees to perform service announcement), the response to content provider 1010 includes Subscriber-List AVP and a new AVP called the "MBMS-Service-Announcement-Result". The Subscriber-List AVP in the response includes the list of users that the network device 1005 actually used for service announcement and has a different value than the one in the MBMS-Service-Announcement-Request AVP. The "MBMS-Service-Announcement-Result" AVP will have an AVP code of 3543 and is of type Unsigned32 and it shall contain a bit mask as defined in the following table:

| Bit | Name | Description |
| --- | --- | --- |
| 0 | Success | The request for service announcement is accepted |
| 1 | Time not allowed | The announcement start time is not allowed |
| 2 | Request ignored | The request for service announcement is ignored |

With the new MBMS-Service-Announcement-Result AVP, the MBMS-Service-Announcement-Response AVP has the following ABNF grammar:
MBMS-Service-Announcement-Response::=<AVP Header: 3542>
[MBMS-Service-Announcement-Result]
[Subscriber-List]
[AVP]

Although FIG. 10 illustrates one example of signal diagram 1000 for signaling service announcement of an MBMS stream, various changes may be made to FIG. 10. For example, various components in FIG. 10 may be combined, further subdivided, or omitted and additional components may be added according to particular needs.

Figure 11:
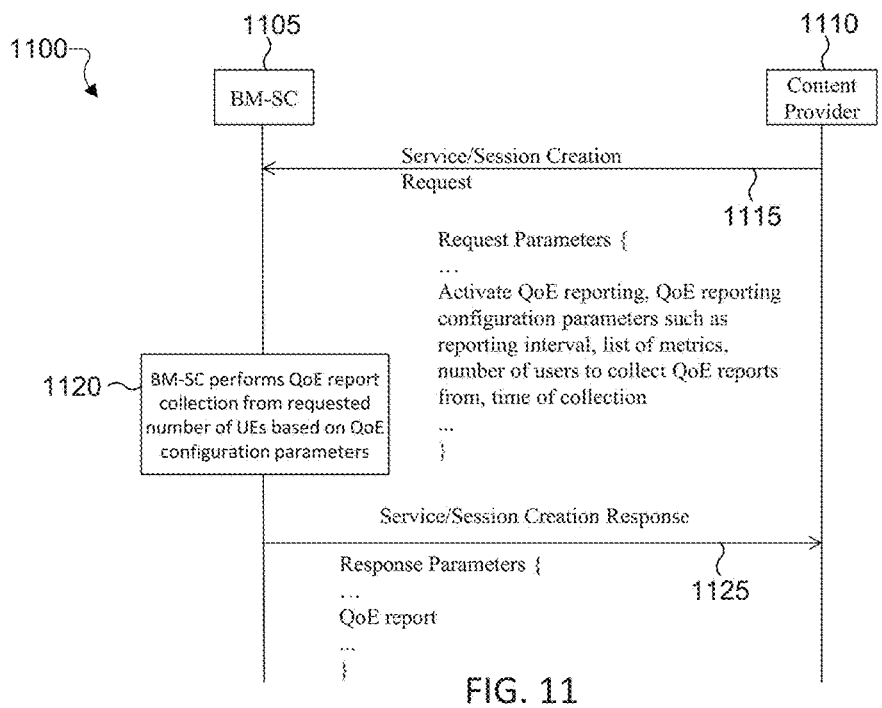
FIG. 11 illustrates an example signal diagram for signaling QoE reporting of an MBMS stream according to various embodiments of the present disclosure.

FIG. 11 illustrates an example signal diagram 1100 for signaling QoE reporting of an MBMS stream according to an embodiment of this disclosure. The embodiment of the signal diagram 1100 for signaling QoE reporting of an MBMS stream shown in FIG. 11 is for illustration only. Other embodiments of the signal diagram 1100 for signaling QoE reporting of an MBMS stream may be used without departing from the scope of this disclosure.

In operation 1115, the network device 1105 receives a QoE reporting request from a content provider, content provider 1110. Network device 1105 possesses capabilities for statistic computation such as QoS, QoE, consumption reporting etc. This feature can be used by the content provider 1110 to infer the quality of broadcast transmission. To enable this feature, the request during MBMS bearer activation (GAR) can be enhanced. When the content provider 1110 sends the GAR request to network device 1105 during bearer activation, the content provider 1110 also requests activation of QoE reporting. Content provider 1110 can request activation of any number of QoS/QoE metrics already supported by the network device 1105. This could either happen using another protocol or message exchange where content provider 1110 requests the supported QoS/QoE metrics by network device 1105 or by learning the list of QoS/QoE metrics when network device 1105 publishes the list. Once the content provider 1110 gets to know the list of supported metrics for quality, the content provider 1110 requests activation of reporting such quality metrics. As part of the activation request, content provider 1110 provides additional details such as report interval, the start and end times of reporting, number/percentage of users the network device 1105 uses while computing the quality statistics etc.

For requesting activation of QoE reporting on broadcast link, for content ingestion interface using Diameter, the content provider 1110 sends a GAR request by including a new AVP called "MBMS-QoE-Report-Request." This AVP will have an AVP code of 3526 with a value type of "Grouped." The AVP has the following ABNF grammar:
MBMS-QoE-Report-Request::=<AVP Header: 3526>
{Enable-QoE-Report}
[QoE-Metrics]
[Report-Interval]
[Report-Start-Time]
[Report-End-Time]
[Number-Of-Users]

*[AVP]

Below is a brief explanation of AVPs included inside the MBMS-QoE-Report-Request:

Enable-QoE-Report: The QoE reporting request includes an indication of QoE reporting activation is required for the payload. This AVP specifies the activation request of QoE reporting. The value for this AVP is "1" (enable QoE reporting) or 0 (disable QoE reporting). This AVP is mandatory and has to be included. The AVP Code of this AVP is 3527.

QoE-Metrics: The QoE reporting request includes an indication including a comma separated list of QoE metrics to report. This AVP specifies a comma separated list of QoE metrics to report. The AVP Code of this AVP is 3528.

Report-Interval: The QoE reporting request includes an indication of how frequently to send QoE reports to the content provider 1110. This AVP specifies how frequently the network device has to report the QoE reports to the content provider. The AVP Code of this AVP is 3529

Report-Start-Time: The QoE reporting request includes an indication of a start time of QoE reporting. This AVP specifies the start time of QoE report collection. The AVP Code of this AVP is 3530.

Report-End-Time: The QoE reporting request includes an indication of an end time of QoE reporting. This AVP specifies the end time of QoE report collection. The AVP Code of this AVP is 3531.

Number-Of-Users: The QoE reporting request includes an indication of a percentage of users to gather the QoE reports from. This AVP specifies the percentage of users to gather the QoE reports from. The AVP Code of this AVP is 3532.

In operation 1120, the network device 1105 performs QoE reporting collection from the requested number of UEs based on the QoE parameters provided in the QoE reporting request. Based on the GAR command with QoE reporting request, the network device 1105 computes the quality statistics and delivers reports to content provider 1110 as requested by the content provider 1110. Alternatively, the network device 1105 ignores QoE reporting request if it does not support quality statistic computation or if the network device's policy does not allow reporting. The response for QoE reporting is sent by the network device 1105 to content provider 1110 using a GAA command.

Based on a GAR command with MBMS-QoE-Report-Request AVP i.e. request for enabling QoE reporting, the network device 1105 can choose to enable reporting of QoE statistics or ignore it. The response for such a request is made using the GAA command with a new AVP called "MBMS-QoE-Report-Response." This AVP will have an AVP code of 3533 with a value type of "Grouped."

For a successful QoE reporting response (i.e. when the network device agrees to report QoE statistics), the response to content provider 1110 includes the Number-Of-Users AVP and two new AVPs called the "MBMS-QoE-Report-Result" and "MBMS-QoE-Report." The value of the Number-Of-Users AVP in the response is the actual value that the network device 1105 uses for statistic computation and could be different than the value requested in the corresponding GAR request. The "MBMS-QoE-Report-Result" AVP will have an AVP code of 3534 and is of type Unsigned32 and it shall contain a bit mask as defined in the following table:

| Bit | Name | Description |
|---|---|---|
| 0 | Success | The request for QoE reporting is accepted |
| 1 | QoE metric not supported | One or more of the QoE metrics are not supported |
| 2 | Too many users | Number of users requested exceed available users |
| 3 | Request ignored | The request for QoE reporting is ignored |

In operation 1125, the network device 1105 transmits a QoE report to the content provider 1110 based on the parameters indicated in the QoE reporting request. The "MBMS-QoE-Report" AVP will have an AVP code of 3535 and is of type OctetString. The value of this AVP will be a string of the complete QoE report. With the two new AVPs (MBMS-QoE-Report-Result and MBMS-QoE-Report), the MBMS-QoE-Report-Response AVP has the following ABNF grammar:

MBMS-QoE-Report-Response::=<AVP Header: 3533>
[MBMS-QoE-Report-Result]
[MBMS-QoE-Report]
[Number-Of-Users]
*[AVP]

Although FIG. 11 illustrates one example of signal diagram 1100 for signaling QoE reporting of an MBMS stream, various changes may be made to FIG. 11. For example, various components in FIG. 11 may be combined, further subdivided, or omitted and additional components may be added according to particular needs.

Figure 12:
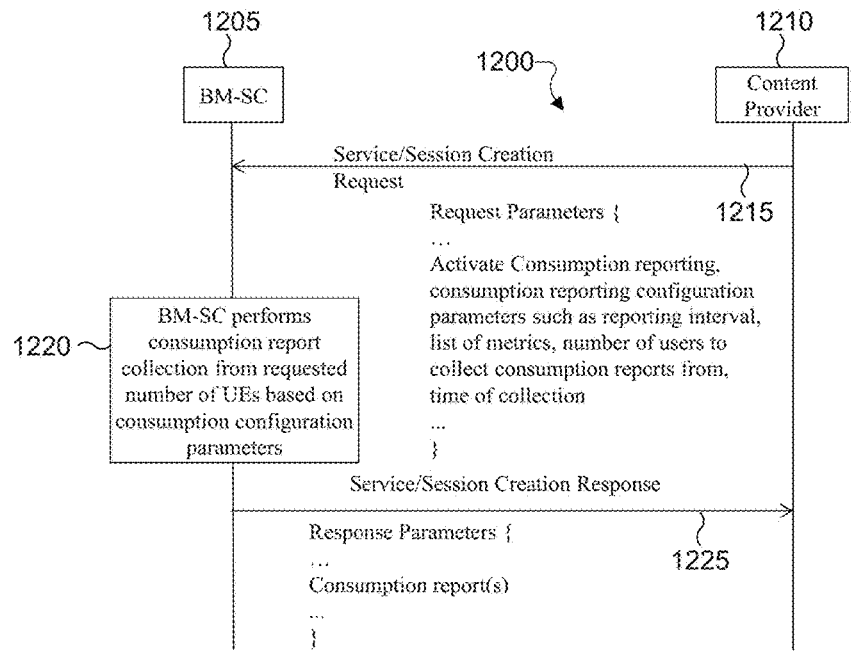
FIG. 12 illustrates an example packet signal diagram for signaling consumption reporting of an MBMS stream according to various embodiments of the present disclosure.

FIG. 12 illustrates an example signal diagram 1200 for signaling consumption reporting of an MBMS stream according to an embodiment of this disclosure. The embodiment of the packet signal diagram 1200 for signaling consumption reporting of an MBMS stream shown in FIG. 12 is for illustration only. Other embodiments of the packet signal diagram 1200 for signaling consumption reporting of an MBMS stream may be used without departing from the scope of this disclosure.

In operation 1215, the network device 1205 receives a consumption reporting request from a content provider, content provider 1210. The network device 1205 possesses capabilities for statistic computation such as QoS, QoE, consumption reporting etc. This feature can be used by the content provider 1210 to infer the consumption statistics of the broadcasted content. When the content provider 1210 sends the GAR request to network device 1205 during bearer activation, the content provider 1210 also requests activation of consumption reporting. content provider 1210 requests activation of any number of consumption metrics already supported by the network device 1205. This could either happen using another protocol or message exchange where content provider 1210 requests the supported consumption metrics by network device 1205 or by learning the list of consumption metrics when network device 1205 publishes the list for everyone to see. Once the content provider 1210 gets to know the list of supported consumption metrics, the content provider 1210 requests activation of reporting such metrics. As part of the activation request, content provider 1210 provides additional details such as report interval, the start and end times of reporting, number/percentage of users the network device should use while computing the consumption statistics etc.

For requesting activation of consumption reporting on broadcast link, for content ingestion interface using Diameter, the content provider 1210 sends a GAR request by including a new AVP called "MBMS-Consumption-Report- Request." This AVP will have an AVP code of 3544 with a value type of "Grouped." The AVP has the following ABNF grammar:

MBMS-Consumption-Report-Request::=<AVP Header: 3544>
{Enable-Consumption-Report}
[Consumption-Metrics]
[Report-Interval]
[Report-Start-Time]
[Report-End-Time]
[Number-Of-Users]
*[AVP]

Below is a brief explanation of AVPs included inside the MBMS-Consumption-Request:

Enable-Consumption-Report: The consumption reporting request includes an indication of a consumption reporting activation is required for the payload. This AVP specifies the activation request of consumption reporting. The value for this AVP is "1" (enable consumption reporting) or 0 (disable consumption reporting). This AVP is mandatory and has to be included. The AVP Code of this AVP is 3545.

Consumption-Metrics: The consumption reporting request includes an indication of a comma separated list of consumption metrics to report. This AVP specifies a comma separated list of consumption metrics to report. The AVP Code of this AVP is 3546.

Report-Interval: The consumption reporting request includes an indication of how frequently the network device 1205 report consumption reports to the content provider 1210. This AVP specifies how frequently the network device reports the consumption reports to the content provider. The AVP Code of this AVP is 3529.

Report-Start-Time: The consumption reporting request includes an indication of a start time for collection of the consumption report. This AVP specifies the start time of consumption report collection. The AVP Code of this AVP is 3530.

Report-End-Time: The consumption reporting request includes an indication of an end time for collection of the consumption report. This AVP specifies the end time of consumption report collection. The AVP Code of this AVP is 3531.

Number-Of-Users: The consumption reporting request includes an indication of a percentage of user to gather the consumption reports from. This AVP specifies the percentage of users to gather the QoE reports from. The AVP Code of this AVP is 3532.

In operation 1220, the network device 1205 performs consumption reporting collection from the requested number of UEs based on consumption configuration parameters indicated in the consumption reporting request. Based on the GAR command with consumption reporting request, the network device 1205 computes the consumption statistics and delivers reports to content provider 1210, as requested by the content provider 1210. Alternatively, the network device 1205 chooses to ignore consumption reporting request if it does not support the corresponding statistic computation or if the network device's policy does not allow reporting. The response for consumption reporting is sent by the network device 1205 to content provider 1210 using a GAA command.

Based on a GAR command with MBMS-Consumption-Report-Request AVP i.e. request for enabling consumption reporting, the network device can choose to enable reporting of consumption statistics or deny it. The response for such a request is made using the GAA command with a new AVP called "MBMS-Consumption-Report-Response". This AVP will have an AVP code of 3547 with a value type of "Grouped."

For a successful consumption reporting response (i.e. when the network device agrees to report consumption statistics), the response to content provider includes the Number-Of-Users AVP and two new AVPs called the "MBMS-Consumption-Report-Result" and "MBMS-Consumption-Report". The value of the Number-Of-Users AVP in the response is the actual value that the network device uses for statistic computation and could be different than the value requested in the corresponding GAR request. The "MBMS-Consumption-Report-Result" AVP will have an AVP code of 3548 and is of type Unsigned32 and it shall contain a bit mask as defined in the following table:

| Bit | Name | Description |
| --- | --- | --- |
| 0 | Success | The request for consumption reporting is accepted |
| 1 | Consumption metric not supported | One or more of the consumption metrics are not supported |
| 2 | Too many users | Number of users requested exceed available users |
| 3 | Request ignored | The request for consumption reporting is ignored |

In operation 1225, the network device 1205 transmits a consumption report to the content provider 1210 based on the parameters indicated in the consumption reporting request. The "MBMS-Consumption-Report" AVP will have an AVP code of 3549 and is of type OctetString. The value of this AVP will be a string of the complete consumption report. With the two new AVPs (MBMS-Consumption-Report-Result and MBMS-Consumption-Report), the MBMS-Consumption-Report-Response AVP has the following ABNF grammar:

MBMS-Consumption-Report-Response::=<AVP Header: 3547>
[MBMS-Consumption-Report-Result]
[MBMS-Consumption-Report]
[Number-Of-Users]
*[AVP]

Although FIG. 12 illustrates one example of a signal diagram 1200 for signaling consumption reporting of an MBMS stream, various changes may be made to FIG. 12. For example, various components in FIG. 12 may be combined, further subdivided, or omitted and additional components may be added according to particular needs.

Figure 13:
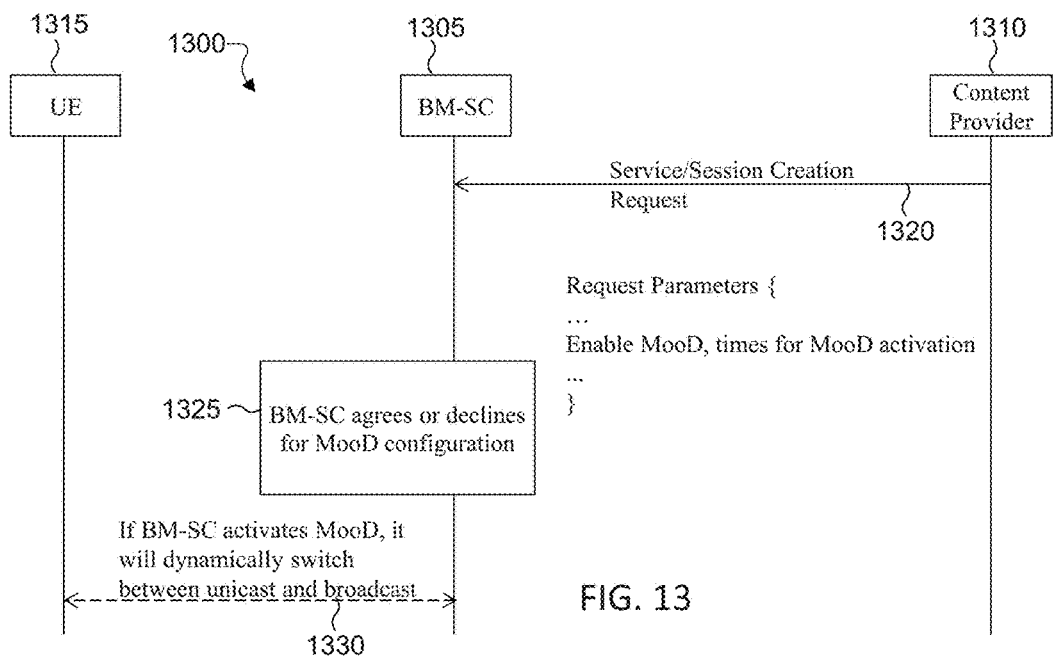
FIG. 13 illustrates an example signal diagram for signaling MBMS operation on demand (MOOD) sourcing of an MBMS stream according to various embodiments of the present disclosure.

FIG. 13 illustrates an example signal diagram 1300 for signaling MBMS operation on demand (MOOD) sourcing of an MBMS stream according to an embodiment of this disclosure. The embodiment of the signal diagram 1300 for signaling MBMS operation on demand (MOOD) sourcing of an MBMS stream shown in FIG. 13 is for illustration only. Other embodiments of the signal diagram for signaling MBMS operation on demand (MOOD) sourcing of an MBMS stream may be used without departing from the scope of this disclosure.

In operation 1320, the network device 1305 receives a MOOD request from a content provider, content provider 1310. Network device possesses capabilities for enabling MOOD based on subscriber demand. This feature can be used by content provider 1310 to request activation of MOOD at any time during the session. The content provider

1310 can request activation of MOOD by sending a GAR command with necessary details such as start time and end time for such activation.

For requesting activation of MOOD, for content ingestion interface using Diameter, the content provider 1310 can send a GAR request by including a new AVP called "MBMS-Activate-MOOD-Request." This AVP will have an AVP code of 3550 with a value type of "Grouped." The AVP has the following ABNF grammar:

MBMS-Activate-MOOD-Request::=<AVP Header: 3550>
{Enable-MOOD}
[Start-Time]
[End-Time]
*[AVP]

Below is a brief explanation of AVPs included inside the MBMS-Activate-MOOD AVP:

Enable-MOOD: The MOOD request includes an indication of MOOD activation is required for the payload. This AVP specifies the activation of MOOD. The value for this AVP is "1" (enable MOOD) or 0 (disable MOOD). This AVP is mandatory and has to be included. The AVP Code of this AVP is 3551.

Start-Time: The MOOD request includes an indication of a start time for enabling or disabling MOOD. This AVP specifies a start time for enabling or disabling MOOD. The AVP Code of this AVP is 3552.

End-Time: The MOOD request includes an indication of an end time for enabling or disabling MOOD. This AVP specifies an end time for enabling or disabling MOOD. The AVP Code of this AVP is 3553.

In operation 1325, the network device 1305 agrees MOOD configuration for the MBMS stream. Based on the GAR command with MOOD activation request, the network device 1305 can either perform MOOD and switch to unicast or broadcast (depending on what it was using prior to the request), or completely ignore such request and activate MOOD only on its discretion (as configured in its policy).

In operation 1330, the network device 1305 transmits a message to the UE 1315 indicating that MOOD is activated and the stream will be dynamically switched between unicast and broadcast. The response for MOOD activation request is sent by the network device 1305 to content provider 1310 using a GAA command.

Based on a GAR command with MBMS-Activate-MOOD-Request AVP i.e. request for enabling MOOD, the network device 1305 chooses to enable MOOD or ignore it. The response for such a request is made using the GAA command with a new AVP called "MBMS-Activate-MOOD-Response." This AVP will have an AVP code of 3554 with a value type of Unsigned32 and it shall contain a bit mask as defined in the following table:

| Bit | Name | Description |
| --- | --- | --- |
| 0 | Success | The request for MOOD is accepted |
| 1 | Request Ignored | The request for MOOD is ignored |

Although FIG. 13 illustrates one example of a signal diagram 1300 for signaling MBMS operation on demand (MOOD) sourcing of an MBMS stream, various changes may be made to FIG. 13. For example, various components in FIG. 13 may be combined, further subdivided, or omitted and additional components may be added according to particular needs.

Figure 14:
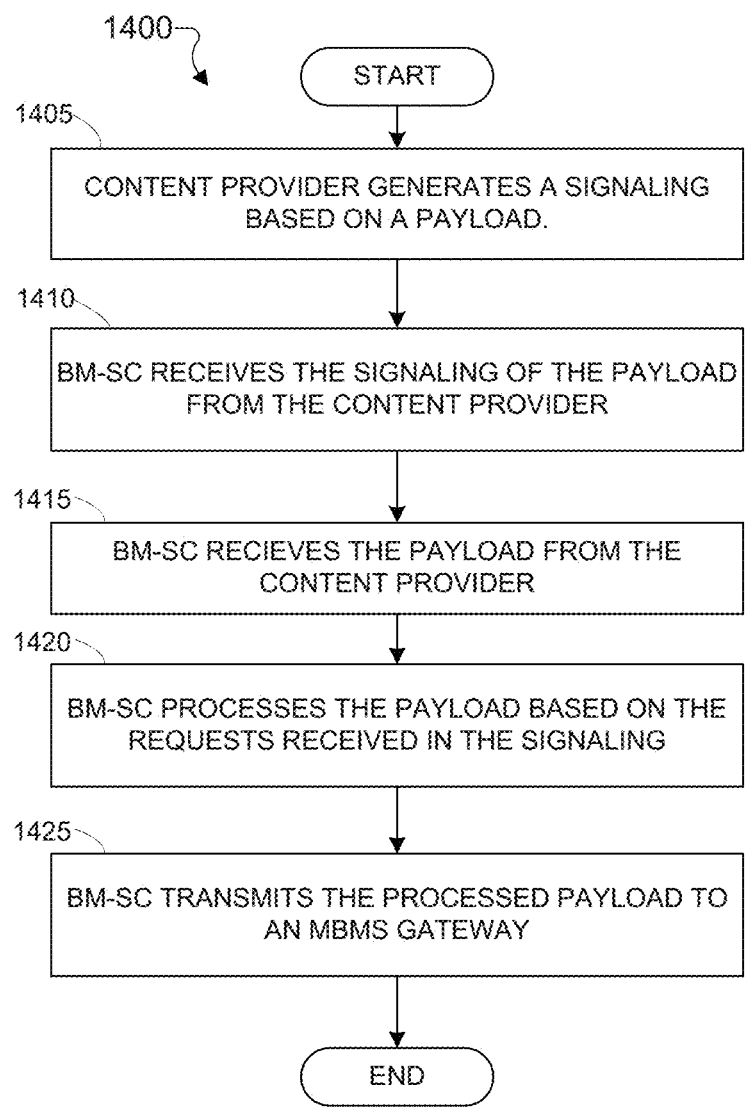
FIG. 14 illustrates an example process for enhanced MBMS ingestion according to various embodiments of the present disclosure.

FIG. 14 illustrates another example process for enhanced MBMS ingestion according to various embodiments of the present disclosure. The following operation is done by a network device for providing enhanced MBMS ingestion.

In operation 1405, the content provider generates a signaling based on a payload. The signaling includes an FEC request, a multicast sourcing request, a service announcement request, a QoE reporting request, a consumption reporting request, and a MOOD request. The FEC request includes indications of FEC activation is required for the payload, whether to bundle two or more ports, a maximum delay for computing the minimum buffer time for FEC operations, an amount of packet loss rate, and a percentage of coverage area to provide 100% recovery. The multicast sourcing request includes indication of multicast sourcing activation is required for the payload. The service announcement request includes indication of a service announcement activation is required for the payload, a service announcement type, a subscriber list, a URL of an SDP file for service announcement, a start time for a service announcement, and a start time for MBMS service. The QoE reporting request includes indication of QoE reporting activation is required for the payload, a comma separated list of QoE metrics to report, how frequently to send QoE reports to the server, a start time of QoE reporting, an end time of QoE reporting, and a percentage of users to gather the QoE reports from. The consumption reporting request includes indication of a consumption reporting activation is required for the payload, a comma separated list of consumption metrics to report, how frequently the network device reports consumption reports to the server, a start time for collection of the consumption report, an end time for collection of the consumption report, and a percentage of users to gather the consumption reports from. The MOOD request includes an indication of MOOD activation is required for the payload, a start time for enabling or disabling MOOD, and an end time for enabling or disabling MOOD.

In operation 1410, the network device receives the signaling of the payload transmitted from the content provider. The signaling includes the respective requests disclosed above to apply to the payload for MBMS.

In operation 1415, the network device receives the payload from the content provider.

In operation 1420, the network device processes the payload based on the request received in the signaling. When FEC is required, the network device applies FEC to the payload based on the parameters in the FEC request. When multicast sourcing is required, the network device encapsulates the payload for MBMS distribution based on the parameters in the multicast sourcing request. When a service announcement is required, the network device provides the service announcement to the UEs based on the parameters of the service announcement request. When QoE reporting is required, the network device provides a QoE report to the content provider based on the parameters in the QoE reporting request. When consumption reporting is required, the network device provides a consumption report to the content provider based on the parameters in the consumption reporting request. When MOOD is required, the network device switches between unicast and broadcast to the UE based on the parameters in the MOOD request.

In operation 1425, the network device transmits the processed payload to an MBMS gateway.

Although FIG. 14 illustrates an example process 1600 for enhanced MBMS ingestion, respectively, various changes may be made to FIG. 14. For example, while shown as a series of steps, various steps may overlap, occur in parallel, occur in a different order, occur multiple times, or not be performed in certain embodiments.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A network device for enhanced multimedia broadcast/multicast services (MBMS) service provisioning and content ingestion, the network device comprising:
   a memory;
   one or more processors operably connected to the memory, the one or more processors configured to:
      receive, from a content provider device, signaling concerning a payload for MBMS;
      receive, from the content provider device, the payload;
      process the payload based on the signaling;
      transmit, to an MBMS gateway, the processed payload, wherein the signaling includes:
         a forward error correction (FEC) request, wherein the FEC request comprises:
            an indication of FEC activation is required for the payload; and
            an indication for a percentage of coverage area to provide 100% recovery, wherein the percentage of coverage area corresponds to a partial coverage area to provide FEC protection, and
         a request to perform a service announcement, wherein the request to perform the service announcement comprises:
            an indication that service announcement activation is required for the payload;
            an indication of a service announcement type;
            an indication of a uniform resource locator (URL) of a session description protocol (SDP) file;
            an indication of a start time for the service announcement; and
            an indication for a start time for MBMS service; and
      provide the service announcement based on the request to perform the service announcement.

2. The network device of claim 1, wherein:
   the FEC request further comprises:
      an indication whether to bundle two or more ports;
      an indication of a maximum delay for computing a minimum buffer time for FEC operations; and
      an indication of an amount of packet loss rate; and
   to process the payload, the one or more processors are configured to process the payload based on the FEC request.

3. The network device of claim 1, wherein:
   the signaling includes a quality of experience (QoE) reporting request;
   the QoE reporting request comprises:
      an indication of QoE reporting activation is required for the payload;
      an indication specifying a list of QoE metrics to report;
      an indication of how frequently to send QoE reports to the content provider device;
      an indication of a start time of QoE reporting;
      an indication of an end time of QoE reporting; and
      an indication for a percentage of users to gather the QoE reports from; and
   the one or more processors are further configured to perform QoE reporting based on the QoE reporting request.

4. The network device of claim 1, wherein the request to perform the service announcement further comprises an indication of a subscriber list.

5. The network device of claim 1, wherein:
   the signaling includes a request for the network device to disable a service announcement activation;
   the request comprises an indication of service announcement activation is disabled; and
   the one or more processors are further configured to provide service announcement configuration parameters to the content provider device.

6. The network device of claim 1, wherein:
   the signaling includes a consumption reporting request;
   the consumption reporting request comprises:
      an indication of consumption reporting activation is required for the payload;
      an indication of a list of consumption metrics to report;
      an indication of how frequently the network device reports consumption reports to the content provider device;
      an indication of a start time for collection of a consumption report;
      an indication of an end time for collection of the consumption report; and
      an indication of a percentage of users to gather the consumption report from; and
   the one or more processors are further configured to perform consumption reporting based on the consumption reporting request.

7. The network device of claim 1, wherein:
   the signaling includes an MBMS operation on demand (MOOD) request;
   the MOOD request comprises:
      an indication of MOOD activation is required for the payload;
      an indication of a start time for enabling or disabling MOOD; and
      an indication of an end time for enabling or disabling MOOD; and
   to process the payload, the one or more processors are configured process the payload based on the MOOD request.

8. The network device of claim 1, wherein:
   the signaling includes a multicast sourcing request;
   the multicast sourcing request comprises an indication of multicast sourcing activation is required for the payload; and
   to process the payload, the one or more processors are further configured process the payload based on the multicast sourcing request.

9. A content provider device for enhanced multimedia broadcast/multicast service (MBMS) content provisioning and content ingestion, the content provider device comprising:
   a memory;
   one or more processors operably connected to the memory, the one or more processors configured to:
      generate a signaling based on a payload;
      transmit, to a network device, signaling concerning a payload for MBMS; and
      transmit, to the network device, the payload to be processed based on the signaling, wherein the signaling includes:
  a forward error correction (FEC) request, wherein the FEC request comprises:
    an indication of FEC activation is required for the payload; and
    an indication for a percentage of coverage area to provide 100% recovery, wherein the percentage of coverage area corresponds to a partial coverage area to provide FEC protection, and
  a request to perform a service announcement, wherein the request to perform the service announcement comprises:
    an indication that service announcement activation is required for the payload:
    an indication of a service announcement type;
    an indication of a uniform resource locator (URL) of a session description protocol (SDP) file;
    an indication of a start time for the service announcement; and
    an indication for a start time for MBMS service, and
  wherein the service announcement is provided based on the request to perform the service announcement.

10. The content provider device of claim 9, wherein:
the FEC request further comprises:
  an indication whether to bundle two or more ports;
  an indication of a maximum delay for computing a minimum buffer time for FEC operations; and
  an indication of an amount of packet loss rate; and
the payload is processed based on the FEC request.

11. The content provider device of claim 9, wherein:
the signaling includes a quality of experience (QoE) reporting request;
the QoE reporting request comprises:
  an indication of QoE reporting activation is required for the payload;
  an indication specifying a list of QoE metrics to report;
  an indication of how frequently to send QoE reports to the content provider device;
  an indication of a start time of QoE reporting;
  an indication of an end time of QoE reporting; and
  an indication for a percentage of users to gather the QoE reports from; and
QoE reporting is performed based on the QoE reporting request.

12. The content provider device of claim 9, wherein the request to perform the service announcement further comprises an indication of a subscriber list.

13. The content provider device of claim 9, wherein:
the signaling includes a request to the network device to disable a service announcement activation;
the request comprises an indication of service announcement activation is disabled; and
the network device provides service announcement configuration parameters to the content provider device.

14. The content provider device of claim 9, wherein:
the signaling includes a consumption reporting request;
the consumption reporting request comprises:
  an indication of consumption reporting activation is required for the payload;
  an indication of list of consumption metrics to report;
  an indication of how frequently the network device reports consumption reports to the content provider device;
  an indication of a start time for collection of a consumption report;
  an indication of an end time for collection of the consumption report; and
  an indication of a percentage of users to gather the consumption report from; and
consumption reporting is performed based on the consumption reporting request.

15. The content provider device of claim 9, wherein:
the signaling includes an MBMS operation on demand (MOOD) request;
the MOOD request comprises:
  an indication of MOOD activation is required for the payload;
  an indication of a start time for enabling or disabling MOOD; and
  an indication of an end time for enabling or disabling MOOD; and
the payload is processed based on the MOOD request.

16. The content provider device of claim 9, wherein:
the signaling includes a multicast sourcing request;
the multicast sourcing request comprises an indication of multicast sourcing activation is required for the payload; and
the payload is processed based on the multicast sourcing request.

17. A method for enhanced multimedia broadcast/multicast service (MBMS) service provisioning and content ingestion by a network device, the method comprising:
receiving, from a content provider device, signaling concerning a payload for MBMS;
receiving, from the content provider device, the payload;
processing the payload based on the signaling;
transmitting, to an MBMS gateway, the processed payload,
wherein the signaling includes:
  a forward error correction (FEC) request, wherein the FEC request comprises:
    an indication of FEC activation is required for the payload; and
    an indication for a percentage of coverage area to provide 100% recovery, wherein the percentage of coverage area corresponds to a partial coverage area to provide FEC protection, and
  a request to perform a service announcement, wherein the request to perform the service announcement comprises:
    an indication of service announcement activation is required for the payload;
    an indication of a service announcement type;
    an indication of a uniform resource locator (URL) of a session description protocol (SDP) file:
    an indication of a start time for the service announcement; and
    an indication for a start time for MBMS service; and
providing the service announcement based on the request to perform the service announcement.

18. The method of claim 17, wherein:
the FEC request comprises:
  an indication whether to bundle two or more ports;
  an indication of a maximum delay for computing a minimum buffer time for FEC operations; and
  an indication of an amount of packet loss rate; and
processing the payload comprises processing the payload based on the FEC request.

19. The method of claim 17, wherein the request to perform the service announcement further comprises an indication of a subscriber list.

20. The method of claim 17, wherein:
the signaling includes a multicast sourcing request;
the multicast sourcing request comprises an indication of multicast sourcing activation is required for the payload; and
processing the payload comprises processing the payload based on the multicast sourcing request.

* * * * *